US009152239B2

(12) United States Patent
Zhu et al.

(10) Patent No.: US 9,152,239 B2
(45) Date of Patent: Oct. 6, 2015

(54) KEYBOARD SAFETY PROTECTION DEVICE

(71) Applicant: PAX COMPUTER TECHNOLOGY (SHENZHEN) CO., LTD., Shenzhen (CN)

(72) Inventors: Bo Zhu, Shenzhen (CN); Shuxian Shi, Shenzhen (CN); Yuzhuo Wang, Shenzhen (CN)

(73) Assignee: PAX Computer Technology (Shenzhen) Co., Ltd., Shenzhen (CN)

( * ) Notice: Subject to any disclaimer, the term of this patent is extended or adjusted under 35 U.S.C. 154(b) by 75 days.

(21) Appl. No.: 13/983,894

(22) PCT Filed: Oct. 31, 2012

(86) PCT No.: PCT/CN2012/083802
§ 371 (c)(1),
(2) Date: Aug. 6, 2013

(87) PCT Pub. No.: WO2014/000355
PCT Pub. Date: Jan. 3, 2014

(65) Prior Publication Data

US 2014/0118971 A1 May 1, 2014

(51) Int. Cl.

| | |
|---|---|
| ***G06F 1/16*** | (2006.01) |
| ***H05K 5/00*** | (2006.01) |
| ***H05K 7/00*** | (2006.01) |
| ***G06F 3/02*** | (2006.01) |
| ***H01H 13/704*** | (2006.01) |

(52) U.S. Cl.
CPC .......... *G06F 3/0219* (2013.01); *H01H 13/704* (2013.01); *H01H 2239/002* (2013.01); *H01H 2239/032* (2013.01); *H01H 2239/038* (2013.01)

(58) Field of Classification Search
CPC ............................ H01H 13/704; G06F 3/0219
USPC ............... 361/679.01, 748, 752, 757, 679.08; 341/20, 22
See application file for complete search history.

(56) References Cited

U.S. PATENT DOCUMENTS 6,710,269 B2 * 3/2004 Kunigkeit et al. ............ 200/5 A
7,270,275 B1 * 9/2007 Moreland et al. ............. 235/492
(Continued)

FOREIGN PATENT DOCUMENTS

CN 201294178 8/2009
CN 201532882 7/2010
CN 201708069 1/2011
(Continued)

*Primary Examiner* — Bernard Rojas
(74) *Attorney, Agent, or Firm* — Hamre, Schumann, Mueller & Larson, P.C.

(57) ABSTRACT

A keyboard safety protection device for protecting a point of sale (POS) device keyboard area from being attacked includes: a protection layer, a metal dome, and a keyboard printed circuit board, wherein a key gold finger and a safety processor are arranged on the keyboard PCB, the protection layer is composed of a layer of PVDF film and a first and second silver slurries, the first and the second silver slurries are coated on the surface of the PVDF film, the surfaces of the first and second silver slurries are provided with a first and second thin film layers respectively, the first and second silver slurries are electrically connected with the key gold finger, and the first and second silver slurries are electrically connected with the safety processor to form a safety detection circuit through the keyboard printed circuit board and the safety processor.

5 Claims, 6 Drawing Sheets

(56) References Cited

U.S. PATENT DOCUMENTS

2010/0117871 A1* 5/2010 Rodrigues ........................ 341/22
2013/0335371 A1* 12/2013 Bayramoglu et al. ........ 345/174

FOREIGN PATENT DOCUMENTS

CN 202772021 3/2013
JP 2001-325665 11/2001

* cited by examiner

KEYBOARD SAFETY PROTECTION DEVICE

TECHNICAL FIELD

The present invention relates to safety protection field of electronic devices, and more particularly, to a keyboard safety protection device for protecting a point of sale (POS) device keyboard area from being attacked.

BACKGROUND

Nowadays, in the commercial field, for the POS device, password keyboard, ATM device and other electronic devices, the keyboard is the part for inputting data information. The input or stored high sensitive data information such as the bank information, password, and register code and so on, are usually attacked and stolen in the situation of unauthorized permission. Therefore, the protection for the data is paid more and more attention, various forms of keyboard protection devices and methods continue to emerge.

The general keyboard protection is mainly focused on the whole protection of the devices, especially on the protection of preventing the disassembly of the housing. A tamper-evident contact are usually disposed on the keyboard print circuit board (PCB), a conductive adhesive is pressed on the tamper-evident contact through the housing of the device to turn on the tamper-evident detection circuit. If the attacker tries to disassemble the housing to attack the inner of the keyboard, the conductive adhesive will not contact the tamper-evident contact and the tamper-evident detection circuit is short circuit thereby triggering the corresponding security measure to delete the high sensitive data information stored in the inner of the device. This protection method is not precise enough, the attacker may not contact the tamper-evident contact and attack the key gold finger region of the keyboard PCB to obtain the high sensitive data information through holing, piercing the housing and other attacking method. There is another protection method using a keyboard protection board to protect the key region of the keyboard, such as description of the CN patent ZL201020297100.2, the keyboard protection device comprises a key for the keyboard, a silica gel and a keyboard PCB. A keyboard protection board is covered and adhered on the gold finger of the keyboard PCB and is electrically connected and turned on through contact on the keyboard protect board. The keyboard protection board is with a flexible film as the base and protects the gold finger on the keyboard PCB through printing a conductive MESH protection circuit, and protects the periphery of the gold finger through a tamper-evident layer of the keyboard protection board. The keyboard protection board focus on the protection of the front and the periphery of the gold finger, when the attacker holes or uncovers the keyboard protection board, the corresponding security mechanism is triggered to delete the high sensitive data information stored in the inner of the electronic device. However, to the conduction of the conductive MESH protection circuit for the front protection, a gap or insulation matter is disposed between two lines printed on the conductive MESH protection circuit. This allows an attacker to find loopholes to attack, steal the high sensitive data stored information stored in gold finger. Further, the MESH protection circuit is printed directly on the flexible film, pressure on the keyboard key applies directly on the flexible film and the MESH protection circuit, frequent or improper operation easily cause the protection circuit traces rupturing, thereby reducing the lifetime of the keyboard protection board.

SUMMARY

The present invention aims at solving the problem in the prior art and provides a keyboard safety protection device with comprehensive protection and long lifetime.

To achieve the above object, the present invention provides the following technical solution.

A keyboard safety protection device comprises a protection layer, a metal dome; a keyboard printed circuit board (PCB). A key gold finger and a safety processor are arranged on the keyboard PCB, the protection layer is composed of a layer of polyvinylidene fluoride (PVDF) film and a first and second silver slurries, the first and second silver slurries are coated on the surface of the PVDF film, the surfaces of the first and second silver slurries are provided with a first and second thin film layers respectively, the first and second silver slurries are electrically connected with the key gold finger, and the first and the second silver slurries are electrically connected with the safety processor through the keyboard PCB to form a safety detection circuit.

A first contact is disposed on the first silver slurry, a second contact and a third contact are disposed on the second silver slurry, the first contact is passed through the PVDF film and electrically connected with the second contact, an isolation groove is disposed between the second silver slurry and the second contact.

The second contact and the third contact are electrically connected with the key gold finger, the key gold finger is provided with a conductive particle configured to facilitate the electrical connection of the second contact and the key gold finger and the electrical connection of the third contact and the key gold finger.

The second thin film layers and the metal dome are provided with a hole configured to facilitate the electrical connection for the second contact and the electrical connection for the third contact.

The height of the conductive particle is smaller than the height of the metal dome.

A silica gel key is disposed on the protection layer, a bottom of the silica gel key is provided with a press protrusion corresponding to the second contact and the third contact on the protection layer.

The present invention using the above technical solutions has the following advantages.

Firstly, the keyboard safety protection device comprises a protection layer, a metal dome; a keyboard PCB. The protection layer covers and electrically connects with the key gold finger on the keyboard PCB, the first and second silver slurries of the protection layer are electrically connected with the key gold finger and the safety processor to form a cover-type safety detection circuit to protect the key gold finger region. Therefore the high sensitive data information in the key region may not be obtained by detecting or monitoring the internal circuit of the key gold finger from outside of the safety protection device.

Secondary, The keyboard safety protection device further comprises a silica gel key, the silica gel key is provided with a press protrusion corresponding to the second contact and the third contact on the protection layer, the press protrusion may ensure the electrical connection of the second contact and the conductive particle and the electrical connection of the third contact and the conductive particle, therefore the electrical connection structure thereof is more stable and simple. When the attacker disassemble the silica gel key illegally, the second contact and the third contact disconnect with the conductive particle, the safety detection circuit cannot detect the input/output of a signal thereby triggering a safety mechanism to delete the high sensitive data information in the key region. Therefore the electrical connection structure functions an anti-disassembly effect.

Thirdly, the protection layer uses the PVDF film as the base, the PVDF film is flexible but has a mechanical strength and toughness, the physical protection and lifetime of the protection layer increases. The first and second silver slurries on the protection layer may avoid a rupture of the protection circuit traces caused by the frequent or improper operation and the lifetime of protection layer may be increased further. The insulation, dustproof and waterproof first and second thin film layers on the outer surface of the protection layer, not only enhances the lifetime of the protection layer further, but also adds a function of the protection layer.

1 protection layer; 2 metal dome; 3 keyboard PCB; 4 key gold finger; 5 safety processor; 6 silica gel key; 7 hole; 11 PVDF film; 12 first silver slurry; 13 second silver slurry; 14 first thin film layer; 15 second thin film layer; 120 first contact; 130 second contact; 140 third contact; 150 isolation groove; 40 conductive particle; 60 press protrusion

DETAILED DESCRIPTION OF THE PREFERRED EMBODIMENTS

To make the objectives, technical solutions and advantages of the present invention clearer, the present invention will be further described hereafter with reference to the accompany drawings and embodiments. However, it shall be understood that, the embodiments described herein are only intended to illustrate but not to limit the present invention.

Figure 1:
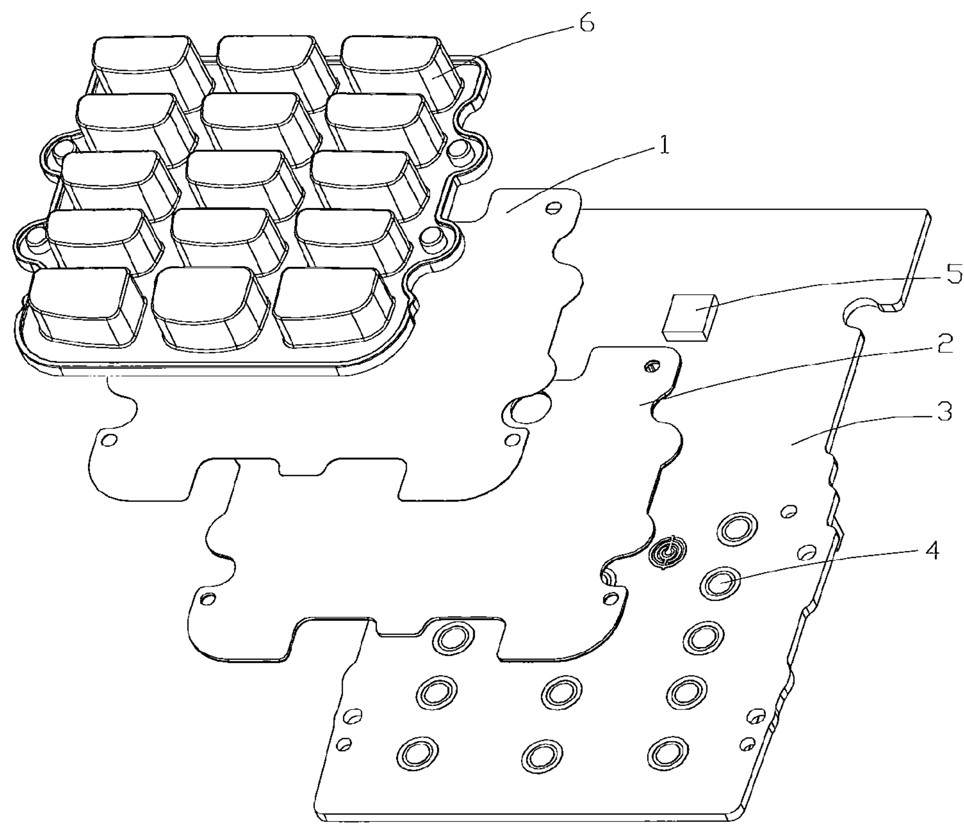
FIG. 1 is an exploded view of the keyboard safety protection device of the present invention.
Figure 2:
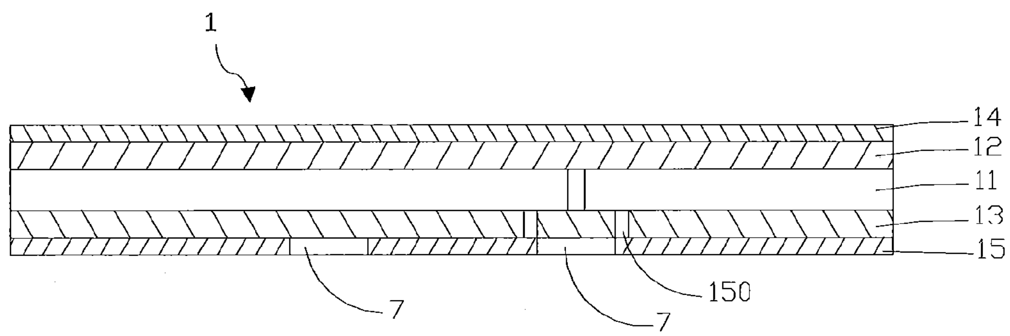
FIG. 2 is a cross-section view of the protection layer of the present invention.
Figure 3:
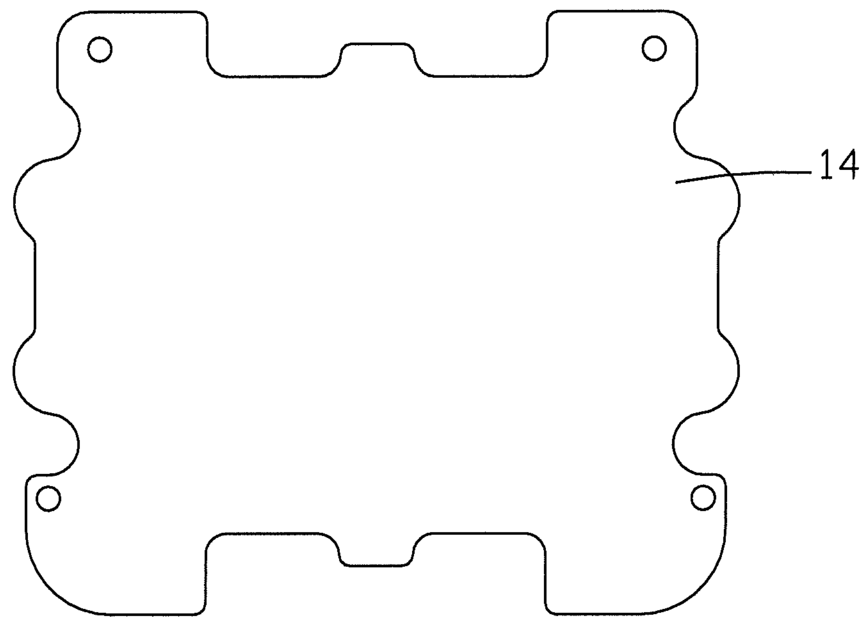
FIG. 3 is a structure schematic view of the first thin film layer of the present invention.
Figure 4:
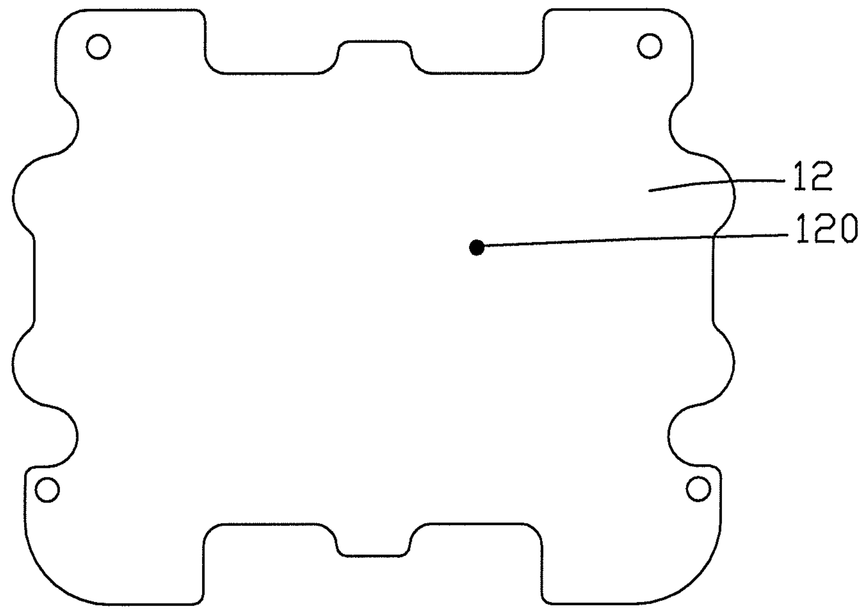
FIG. 4 is a structure schematic view of the first silver slurry of the present invention.
Figure 5:
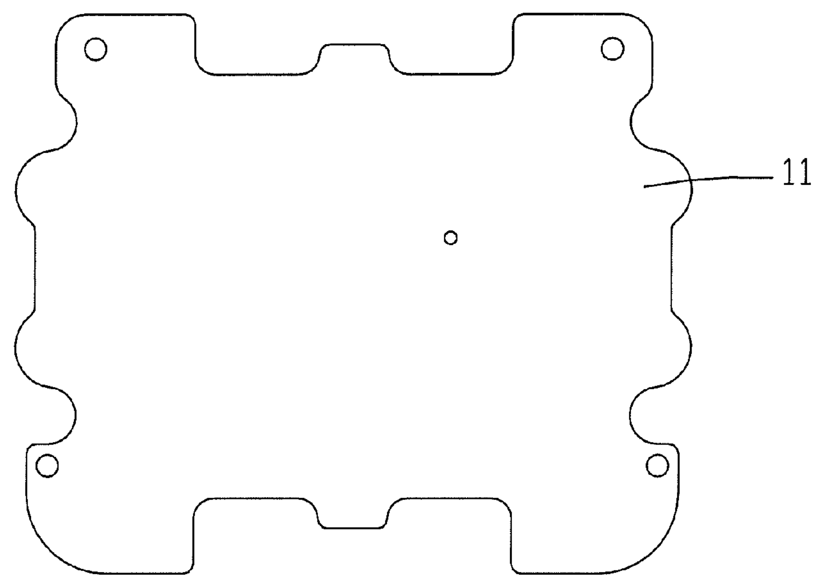
FIG. 5 is a structure schematic view of the PVDF film of the present invention.
Figure 6:
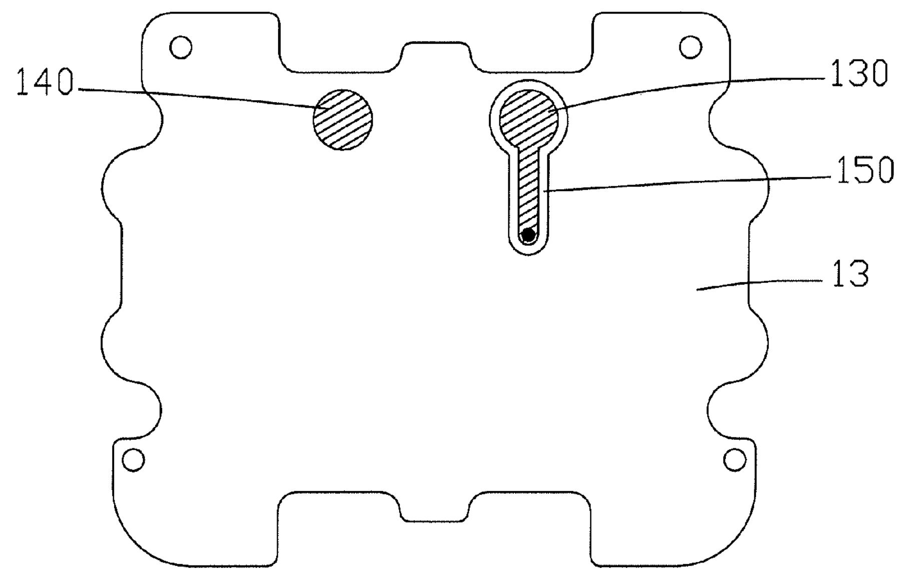
FIG. 6 is a structure schematic view of the second silver slurry of the present invention.
Figure 7:
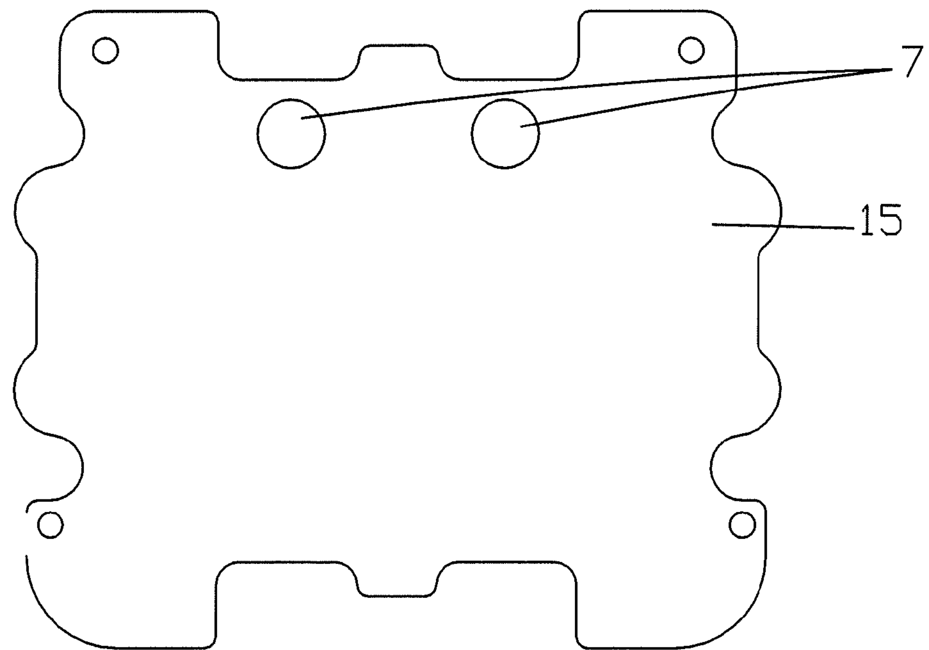
FIG. 7 is a structure schematic view of the second thin film layer of the present invention.
Figure 8:
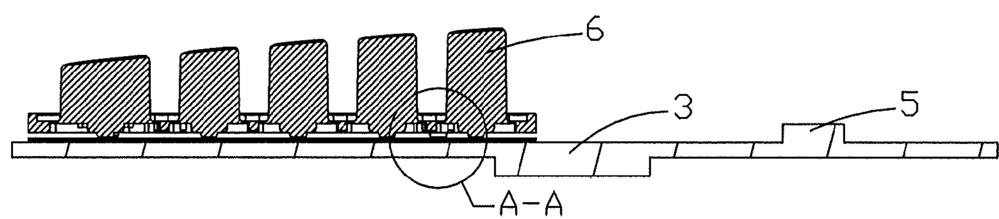
FIG. 8 is a cross-section view of the keyboard safety protection device of the present invention.
Figure 9:
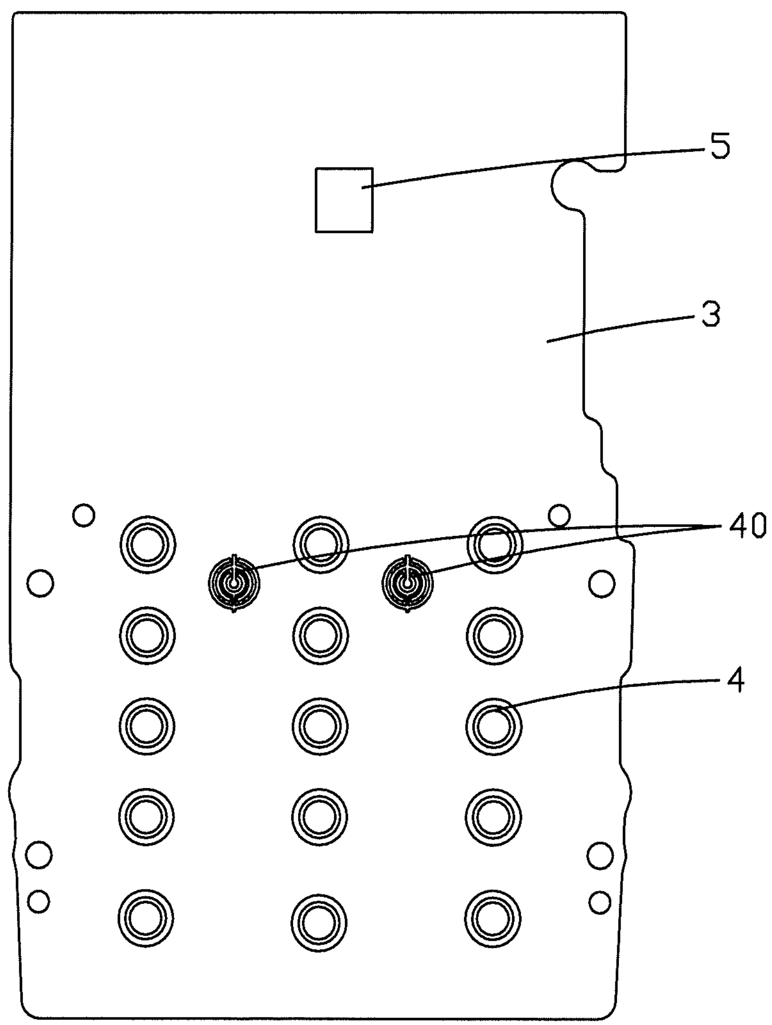
FIG. 9 is a structure schematic view of the keyboard PCB of the present invention.
Figure 10:
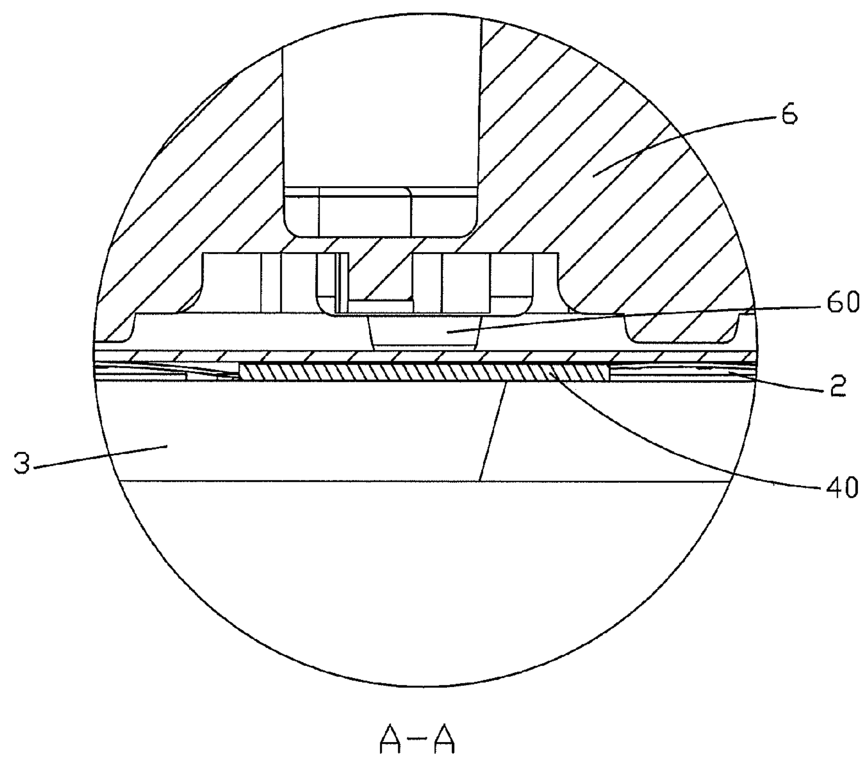
FIG. 10 is an enlarged view of A-A line of the present invention.
Figure 11:
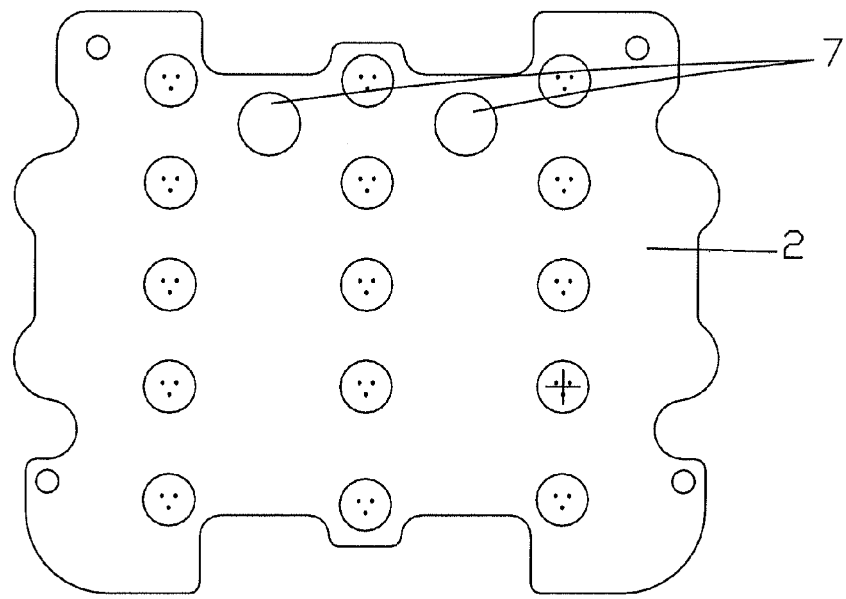
FIG. 11 is a structure schematic view of the metal dome of the present invention.

Referring to FIGS. 1 and 2, the keyboard safety protection device comprises a protection layer 1, a metal dome 2, a keyboard PCB 3. A key gold finger 4 and a safety processor 5 are arranged on the keyboard PCB 3. The protection layer 1 is composed of a layer of polyvinylidene fluoride (PVDF) film 11 and a first and second silver slurries 12, 13 coated on the surface of the PVDF film 11. The PVDF film is flexible but has a mechanical strength and toughness, and the physical protection and lifetime of the protection layer increases. The first and second silver slurries 12, 13 on the protection layer may avoid a rupture of the protection circuit traces caused by the frequent or improper operation and the lifetime of protection layer 1 may be increased further. The insulation, dustproof and waterproof first and second thin film layers 14, 15 on the outer surface of the protection layer 1, not only enhances the lifetime of the protection layer 1 further, but also adds a function of the protection layer 1. The first and second silver slurries 12, 13 are electrically connected with the key gold finger 4, and the first and second silver slurries 12, 13 are electrically connected with the safety processor 5 through the keyboard PCB 3 to form a safety detection circuit. The first and second silver slurries 12, 13 act as a signal detecting or monitoring layer of a safety mechanism. The safety detection circuit comprises two circuit loop, the safety processed 5 is electrically connected with the first silver slurry 12 through the key gold finger 4 to form a first signal detecting circuit loop and the safety processed 5 is electrically connected with the second silver slurry 13 through the key gold finger 4 to form a second signal detecting circuit loop. When the attacker breaks or pierces the protection layer 1, the PVDF film 11 is broken, the first silver slurry 12 and the second silver slurry 13 is conductive and leads a short circuit of the first signal detecting circuit loop and the second first signal detecting circuit loop, so the safety mechanism of the safety processor 5 is triggered to delete or ruin the high sensitive data information in the key region.

A first contact 120 is disposed on the first silver slurry 12, a second contact 130 and a third contact 140 are disposed on the second silver slurry 13, the first contact 120 is passed through the PVDF film 11 and electrically connected with the second contact 130, an isolation groove 150 is disposed between the second silver slurry 13 and the second contact 130 to disconnect the first silver slurry 12 and the second silver slurry 13, so the first silver slurry 12 and the second silver slurry 13 function as two signal layers of the safety processor 5 to form two signal detecting circuit loops.

The second contact 130 and the third contact 140 are electrically connected with the key gold finger 4. As a part for inputting or storing the high sensitive data information, the key gold finger 4 should be electrically connected with the safety processor 5. The key gold finger 4 is provided with a conductive particle 40 configured to facilitate the electrical connection of the second contact 130 and the key gold finger 4 and the electrical connection of the third contact 140 and the key gold finger 4. The second contact 130 and the third contact 140 may be electrically connected to the key gold finger 4 directly, but because of the metal dome 2 disposed between the protection layer 1 and the keyboard PCB 3, to electrically connect the protection layer 1 and the key gold finger 4, the pressure need to be increased and the protection layer 1 deforms downward. So the conductive particle 40 may avoid a damage resulted by the large deformation causing by the press and prevent the decrease of the lifetime.

the second thin film layer 15 and the metal dome 2 are provided with a hole 7 configured to facilitate the electrical connection of the second contact 130 and the key gold finger 4 and the electrical connection of the third contact 140 and the key gold finger 4, then the connection distance is the most short and the second contact 130 and the third contact 140 is in the shadow of the protection layer 1, so the second contact 130 and the third contact 140 are convenient to be protected and are safer.

A silica gel key 6 is disposed on the protection layer 1, a bottom of the silica gel key 6 is provided with a press protrusion 60 corresponding to the second contact 130 and the third contact 140 on the protection layer 1. The press protrusion 60 is pressed against the protection layer 1 to make sure that the second contact 130 and the third contact 140 are electrically connected with the key gold finger 4, therefore the electrical connection structure thereof is more stable and simple. The height of the conductive particle 40 is smaller than the height of the metal dome 2. The conductive particle 40 cooperates with the press protrusion 60 of the silica gel key 6 to make the connection structure have a tamper-evident effect. When the attacker disassemble the silica gel key illegally, the pressure of the press protrusion 60 to the protection layer disappears, the second contact 130 and the third contact 140 disconnect with the conductive particle 40, the input/output detecting signal sent by the safety processor 5 cannot be detected thereby triggering the safety mechanism to delete the high sensitive data information in the key region.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A keyboard safety protection device comprising:

a protection layer, a metal dome, and a keyboard printed circuit board, wherein, a key gold finger and a safety processor are arranged on the keyboard printed circuit board, the protection layer is composed of a layer of polyvinylidence fluoride (PVDF) film and a first and second silver slurries, the first and second silver slurries are coated on the surface of the PVDF film, the surfaces of the first and second silver slurries are provided with a first and second thin film layers respectively, the first and second silver slurries are electrically connected with the key gold finger, and the first and second silver slurries are electrically connected with the safety processor through the keyboard printed circuit board to form a safety detection circuit, and wherein, a first contact is disposed on the first silver slurry, a second contact and a third contact are disposed on the second silver slurry, the first contact is passed through the PVDF film and electrically connected with the second contact, an isolation groove is disposed between the second silver slurry and the second contact.

2. The keyboard safety protection device of claim 1, wherein, the second contact and the third contact are electrically connected with the key gold finger, the key gold finger is provided with a conductive particle configured to facilitate the electrical connection of the second contact and the key gold finger and the electrical connection of the third contact and the key gold finger.

3. The keyboard safety protection device of claim 2, wherein the second thin film layers and the metal dome are provided with a hole configured to facilitate the electrical connection for the second contact and the electrical connection for the third contact.

4. The keyboard safety protection device of claim 3, wherein the height of the conductive particle is smaller than the height of the metal dome.

5. The keyboard safety protection device of claim 4, wherein a silica gel key is disposed on the protection layer, a bottom of the silica gel key is provided with a press protrusion corresponding to the second contact and the third contact on the protection layer.

* * * * *